United States Patent [19]

Rigazio et al.

[11] 4,311,984
[45] Jan. 19, 1982

[54] DEVICE FOR THE CHECKING OF THE PRESSURE OF TIRES OF A MOTOR VEHICLE

[76] Inventors: Elio Rigazio, Via Tripoli 66, Vercelli; Galileo Rossi, Via Jacopo Palma 26, Milan; Piero Salussolia, Via Castello 6, Massazza, all of Italy

[21] Appl. No.: 100,250
[22] Filed: Dec. 4, 1979

[30] Foreign Application Priority Data

Dec. 4, 1978 [IT] Italy ............................... 30519 A/78

[51] Int. Cl.³ ............................................. B60C 23/02
[52] U.S. Cl. .................................. 340/58; 200/61.25; 335/206
[58] Field of Search ............ 340/58; 200/61.22, 61.25; 335/205, 206

[56] References Cited

U.S. PATENT DOCUMENTS

| | | | |
|---|---|---|---|
| 3,521,230 | 7/1970 | Poole | 340/58 |
| 3,873,787 | 3/1975 | Nozi | 340/58 |
| 3,978,448 | 8/1976 | Vago | 340/58 |
| 4,209,765 | 6/1980 | Mitchell | 340/58 |

Primary Examiner—Alvin H. Waring
Attorney, Agent, or Firm—Oblon, Fisher, Spivak, McClelland & Maier

[57] ABSTRACT

A device for signalling the pressure in a tire fitted to a wheel of a vehicle, which device comprises a surveying member constituted by a cylinder in which there slides in sealing relationship a piston with a magnetic core in antagonism to a spring, to form a chamber in communication with the tire, the said surveying member being mounted axially on the rotating bearing of the wheel to find itself axially aligned with a sensor member fixed to a fixed part of the vehicle, the said sensor member comprising a couple of magnetic switches normally open and supported in mutual angular position and between which there is arranged a secondary magnet keeping the said switches closed, the magnetic core having a direction of magnetization opposed to the direction of magnetization of the secondary magnet, the proximity of these magnets causing the opening of the magnetic switches, an electric circuit being piloted by the opening of the switches to emit a signal.

3 Claims, 4 Drawing Figures

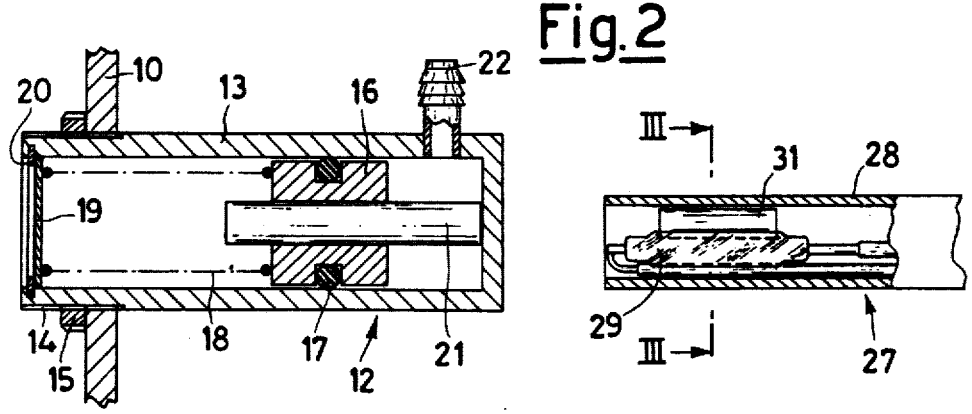
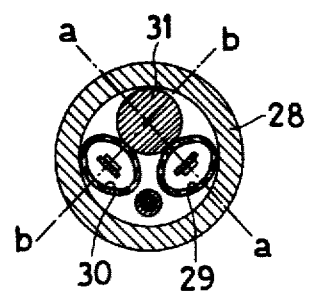
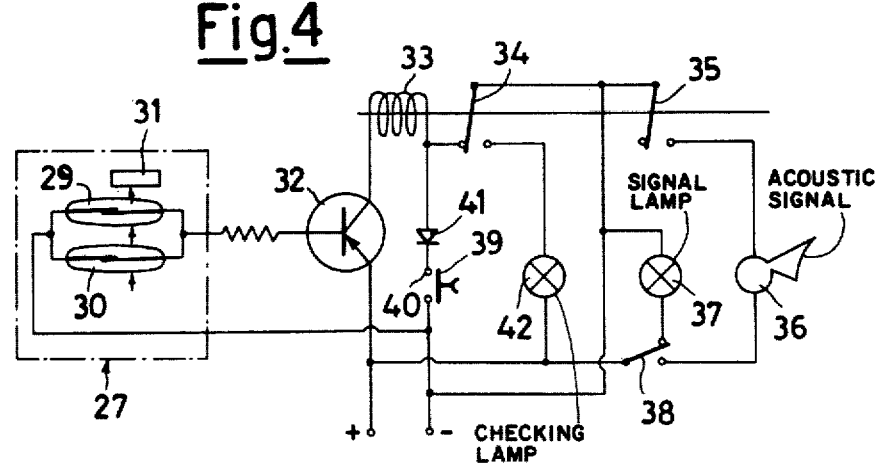

DEVICE FOR THE CHECKING OF THE PRESSURE OF TIRES OF A MOTOR VEHICLE

The inconveniences are widely known that come from the accidental reduction of pressure in the tires of a vehicle and that result at least in the spoilment of the tire, with an apparent possibility of more serious accidents if the spoiling of the tire casing prejudices the roadholding of the motor vehicle.

The necessity of a continuous checking of the pressure existing in the tire is particularly felt in heavy vehicles, e.g. in trailer-trucks, where the lack of pressure in one wheel influences less immediately the behaviour of the vehicle, mainly if the tire in question involved with this loss of pressure is twin-mounted with another one.

Several devices were proposed which essentially are based on the presence of a sensor element for pressure mounted on the wheel and apt to control a receiver fixed to the vehicle.

The problem of a correct and reliable continuous checking of the pressure in tires, while being a simple idea raises however many difficulties in practice: as a matter of fact, the device should be simple, reliable, and sturdy to resist even heavy strain as obviously to be foreseen in a wheel of a motor vehicle.

Those checking devices are found to be scarcely reliable and onerous to be serviced, which entrust sliding contacts with the transmission of the information about the pressure between the wheel and the fixed part of the vehicle.

Also devices were suggested that entrust with the transmission of the information about pressure, a radio transmitter fitted to the wheel, the signal of which is destined to a receiver fixed to the frame of the vehicle: the difficulty of putting such a solution to practice and the cost thereof will be immediately appreciated, as well as the scarce reliability due to parasitic interfering radio frequencies.

Devices utilizing a magnetic control, such as a switch controlled to move to open or to close under the influence of a magnetic field, may appear to be suitable per se for the transmission of a signal between the wheel and a member fastened to the frame of the vehicle. However those switches, known in the trade as "reeds", are equipped with dainty contacts easy to be shifted between the positions of open and closed, by shocks and vibrations, thereby giving erroneous indications.

It is a main object of the present invention to obviate the inconveniences of the known state of the art, which substantially restrained the spreading of pressure signalling devices of the kind mentioned; by making possible instead the provision of a signalling device simple in construction, and, therefore, not costly but absolutely reliable, capable of response also to modest pressure variations without being influenced by other external factors causing parasitic signals.

To attain this object as well as other objects, which will appear more clearly from the following description, the invention proposes to provide a device for signalling the pressure in a tire fitted to a wheel of a vehicle, which device comprises a surveying member constituted by a cylinder in which there slides in sealing relationship a piston with a magnetic core in antagonism to a spring, to form a chamber in communication with the tire, the said surveying member being mounted axially on the rotating bearing of the wheel to find itself axially aligned with a sensor member fixed to a fixed part of the vehicle, the said sensor member comprising a couple of magnetic switches normally open and supported in mutual angular position and between which there is arranged a secondary magnet keeping the said switches closed, the magnetic core having a direction of magnetization opposed to the direction of magnetization of the secondary magnet, the proximity of these magnets causing the opening of the magnetic switches, an electric circuit being piloted by the opening of the switches to emit a signal.

To make the objects and features of the invention more fully clear, an embodiment thereof given by way of example is hereinafter described with greater detail as illustrated in the accompanying drawings, wherein:

FIG. 2 shows a view in vertical section of a detail of FIG. 1;

FIG. 3 is a view in section along the plane tracing the line III—III in FIG. 2;

FIG. 4 is an electric circuit diagram, of the electric circuit piloted by the device of FIG. 2.

Figure 1:
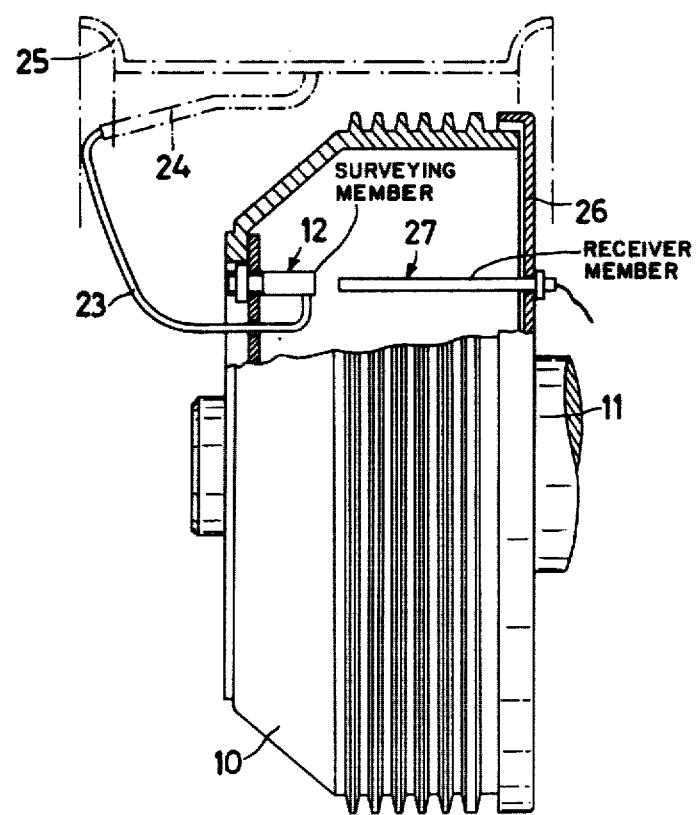
FIG. 1 shows a diagrammatical view of a detail of a vehicle in which the device according to the invention is provided.

In FIG. 1 there is shown a usual drum 10 of the brakes of a vehicle, turning on a hub 11. There are not shown any details of the known members of the vehicle associated with the drum and with its hub, since they may be of any conventional kind.

In association with the drum 10 there is provided a surveying member 12 better shown in FIG. 2; it consists of a cylinder 13 of non-magnetic material with a threaded end 14; this end is screwed into a corresponding hole provided in the front portion of the rotating drum group and is held by a counter-nut 15. In the cylinder 13 there slides a piston 16 equipped with a sealing gasket 17, pushed by the compressed spring 18, bearing against the bottom 19, held in place by the elastic ring 20: in the piston there is fixed the cylindrical magnet 21.

The chamber formed by the piston 16 in the cylinder is provided with a connection 22 suited to receive a small flexible tube 23 adapted to be coupled with a valve 24 of a tire diagrammatically represented at 25, in order that in the chamber of the cylinder there be the same pressure existing in the tire.

In a fixed part of the vehicle, that is to say in a part not rotating with the wheel and indicated as brake shoe holder plate 26, there is fixed the receiver member 27 with a nut in a manner analogous to the fastening shown with reference to member 12. The receiver 27 is made of a rod 28 of non-magnetic material inside which there are assembled two switches 29 and 30 with magnetically controlled blades (laminae) of a kind known per se, which are directed with their respective movable contacts in planes forming an angle with each other and indicated with a—a and b—b in FIG. 3, and turned towards a magnet 31.

The switches 29 and 30, of the kind normally open, are kept closed by the presence of the magnet 31 and are electrically connected in parallel to pilot an alarm circuit apt to signal their contemporaneous opening.

An example of this circuit is shown in FIG. 4. The two switches 29 and 30 forming a couple connect the basis of the amplifying transistor P-N-P 32 to earth so as to make it conductive, whence the positive is fed to the coil 33 of a remote control switch having two contacts 34 and 35: the contact 34 in the position shown in the drawing keeps feeding of the negative of the coil and the relay is automatically kept in the position shown in the drawing, while the contact 34 in relax feeds the checking lamp 42.

If both switches 29 and 30 open, the transistor passes to cut-off, the coil 33 is deenergized and contacts 34 and 35 shift towards the right side of the figure. The contact 35 then feeds alternatively the acoustic signal 36 or the signal lamp 37 according to which is the position of the switch 38.

If the contacts of the switches 29 and 30 close again, the position shown in the drawing can be recovered by acting upon the push button 39 and thereby connecting to the negative the terminal 40 and energizing the coil. To this terminal can be connected a plurality of circuits identical with the one shown in the figure, which will not mutually influence one another owing to the presence of the diode 41 which prevents a return of current between the various coils 33 of the remote control switches.

The operation of the apparatus described can be immediately understood from its structure.

First of all it should be noted that the magnets 21 and 31 are mounted with equal polarities facing each other in order that the influence of the greater magnet 21 may in practice annul the magnetization of the magnet 31 if the magnets are in proximity of each other. For this purpose, the magnet 21 has a magnetic field the intensity of which is many times the intensity of the magnetic field of magnet 31.

If the tire is at correct pressure, the piston 16 is pushed towards the left side of FIG. 2, keeping at any way far from the magnet 31 during the revolution of the wheel.

If the tire is at reduced pressure, the calibrated spring 18 pushes the piston towards the position shown in FIG. 2 and during the revolution of the wheel, when the members 12 and 27 are confronted, the influence of the magnet 31 upon the switches 29 and 30 becomes nil and they open for an instant thereby energizing permanently the signallers, namely the optical signaller 37 and the acoustic signaller 36 in accordance with the irreversible movement of the contacts 34, 35 of the remote control switch.

The advantages of the device described are evident: the arrangement of the switches 29 and 30 at an angle with respect to each other ensures that no shock or vibration in any direction can contemporaneously push the movable contacts of both switches to open, whatever the orientation of the rod 28 during assembling may be. The switches and the magnet are fastened in a suitable manner within the hollow rod, for instance by means of a suitable glue.

The fact that the opening of the contact is ensured by the proximity of a magnet oriented in the predetermined manner described, with respect to the magnet 31 enables one to arrange two couples of members 12-27 on one same circumference of the wheel, if in every couple the magnets are oriented opposedly. In fact each magnet 21 will pilot the opening of the switches subjected to that magnet 31 that has its polarity opposed with respect to its own polarity, without influencing the magnet 31 that has equal direction of polarity and that finds itself on its trajectory during the revolution of the wheel.

This possibility of assembling two couples of members of the device on one same wheel bearing, will be particularly appreciated in the case of drums sustaining twin wheels as usual with industrial motor vehicles.

It is evident that the assembling arrangement hereinabove specified is merely indicative since the members 12 and 27 may be applied to any two parts of the vehicle, the one turning with the tire, the other one fixed to the hub thereof. According to the specific configuration of the wheel assembly, the engineer will select the most suitable places to fasten the members.

Also the external configuration of the members 12 and 27 may vary, though a cylindrical threaded shape is particularly advantageous for quick fastening with the provision of simple holes, so as to permit an accurate axial adjustment of position, to determine the most suitable distance between said members.

Also the circuit represented in FIG. 4 is merely indicative, since it may be replaced by equivalent circuits capable of signalling the opening of the contacts 29 and 30. It should be noted however that with the circuit arrangement shown, a high degree of self-control of alarm is attained. In particular, if the electric line of the switches 29 and 30 is cut owing to accidental break, the circuit signals the failure in a manner identical to a drop of pressure in the tire. Moreover, the device as it is fed (on fitting the key into the board), is pre-arranged so that all of the signalling lamps belonging to the various tires become lit to allow for the checking of operation; if then the push button 39 is pressed, the signalling lamps become extinguished and the circuits for running surveyance are activated.

Moreover, the engineer will be in a position to appreciate the simplicity of construction of the whole device, that limits the cost of production though attaining full reliability, being the main object of the invention.

Obviously constructive modifications may be made with the device with respect to the embodiment diagrammatically described and illustrated, without leaving the scope of the instant invention.

We claim:

1. A device for signalling the pressure in a tire fitted to a wheel of a vehicle, which device comprises a surveying member constituted by a cylinder in which there slides in sealing relationship a piston with a magnetic core in antagonism to a spring, to form a chamber in communication with the tire, the said surveying member being mounted axially on the rotating bearing of the wheel to find itself axially aligned with a sensor member fixed to a fixed part of the vehicle, the said sensor member comprising a couple of magnetic switches normally open and supported in mutual angular position and between which there is arranged a secondary magnet keeping the said switches closed, the magnetic core having a direction of magnetization opposed to the direction of magnetization of the secondary magnet, the proximity of these magnets causing the opening of the magnetic switches, an electric circuit being piloted by the opening of the switches to emit a signal.

2. A device according to claim 1, characterized in that the magnetic core mounted on the piston of the surveying member has a magnetic field intensity greater by many times than the intensity of the magnetic field of the secondary magnet that keeps the said switches closed.

3. A device according to claim 1, characterized in that the sensor member comprises an elongated hollow rod, in the interior of whose ends there are mounted the said switches and the said magnet, which are fastened by glueing, and the cables ending at the switch run along the rod.

* * * * *